June 5, 1945.　　　D. MacKENZIE　　　2,377,349
VIBRATION ANALYZER
Filed July 24, 1943
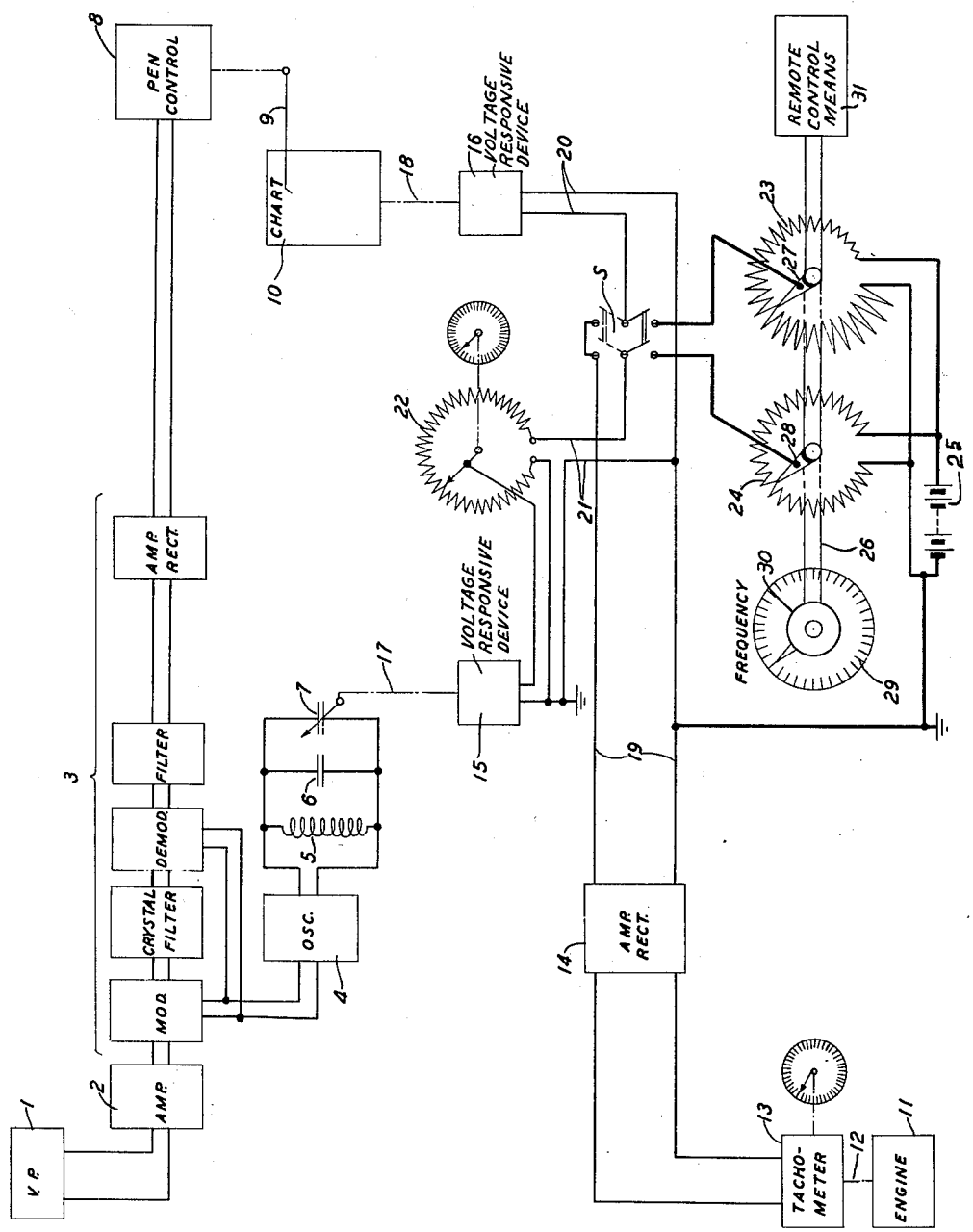
INVENTOR
D. MacKENZIE
BY
G. H. Heydt.
ATTORNEY Patented June 5, 1945

2,377,349

UNITED STATES PATENT OFFICE 2,377,349

VIBRATION ANALYZER

Donald MacKenzie, South Orange, N. J., assignor to Bell Telephone Laboratories, Incorporated, New York, N. Y., a corporation of New York Application July 24, 1943, Serial No. 495,987

3 Claims. (Cl. 234—5.6)

This invention relates to an improvement in vibration analyzers, with particular reference to the provision of a choice of arguments with respect to which vibrations may be analyzed.

In the usual apparatus of this class a mechanical vibration is translated by a suitable device into a corresponding electrical vibration which is thereafter resolved into its components of various frequencies. The result of the analysis is a chart on which are recorded horizontally the frequencies and vertically the amplitudes of these components, it being required that the vibration producing agency, for example, an airplane engine, operate with no change of condition throughout the production of any one record. In a complete analysis, if it is desired, of airplane vibrations over a wide range of engine speeds it is necessary to select discrete values of engine speed and in each of them to make an amplitude versus frequency analysis. The danger is obvious that some critical speed will be overlooked.

A novel form of vibration analyzer which does not require that the vibration producing agency operate without change has been described in application Serial No. 483,129, filed April 15, 1943, by W. J. Brown. Brown's apparatus provides a chart on which engine speeds are recorded as abscissas, while as ordinates are recorded the amplitudes of vibration components of frequencies proportional to the instantaneous engine speed. The factor of proportionality may be varied at the will of the observer so that various curves of the record will exhibit as functions of engine speed the amplitudes of vibration components of which the frequencies vary from two-fifths to ten times engine revolutions per second. A score or more of individual curves are obtained and from their intersections with the ordinate corresponding to any particular engine speed, there may by replotting be obtained an approximation to the conventional analysis where amplitude versus frequency is plotted for a constant condition of the vibration producing agency. Such a replotted curve consists of discrete points and conceivably a critical frequency may be overlooked.

Briefly, then, the conventional analyzers give continuous curves of amplitude versus frequency at discrete speeds, while the analyzer described in the Brown application referred to gives continuous curves of amplitude versus speed at discrete frequencies. Brown's analyzer will not directly furnish the conventional analysis and, so far as known, no analyzer now in commercial use will directly furnish the novel analysis of Brown.

The object of the present invention is to provide for the apparatus described in the Brown application an improvement whereby that apparatus may be instantly enabled to produce the conventional analysis when the engine speed can be maintained constant, alternatively to the novel analysis obtained by Brown for varying engine speed.

The invention will be understood from the following description read with reference to the accompanying drawing, of which the single figure exhibits the circuit of the apparatus described by Brown in the above-mentioned application together with the improvement therein embodying the present invention, said improvement being drawn in bold lines in the figure. Certain details of the Brown circuit are omitted as unnecessary to a complete understanding thereof and of the present improvement.

In the figure, vibration pick-up 1 detects the mechanical vibration to be analyzed and translates it into an electrical vibration which is amplified by amplifier 2, the output of which is analyzed into its frequency components by analyzing circuit 3. Pick-up 1 may be of any suitable design, while amplifier 2 is a conventional circuit and analyzer 3 is preferably that described in U. S. Patent 1,976,481, granted October 9, 1934, to T. G. Castner. Analyzer 3 includes variable oscillator 4 which generates an alternating current of frequency determined by the constants of the tuned circuit consisting of fixed inductance 5, fixed condenser 6 and variable condenser 7. Inductance 5 and condenser 6 are so chosen that with the maximum capacity of condenser 7 the oscillator frequency is that transmitted by the crystal filter of analyzer 3, say, 92,000 cycles per second. The variation of condenser 7 enables this frequency to be varied from 92,000 to 92,500 cycles per second, a range empirically found adequate for the prime object of the apparatus, namely, the analysis of the vibrations of airplane surfaces caused by the functioning of the plane's engine. The oscillator frequency is, of course, inversely proportional to the square root of LC, where L is the value of the inductance 5 and C is the total capacity of condensers 6 and 7. A one per cent change in C corresponds to the required one-half per cent change in oscillator frequency; over so narrow a range the generated frequency varies nearly enough linearly with C. The capacity of condenser 7 therefore varies between a few micro-microfarads and one per cent of the capacity of condenser 6.

For any given value of C within the range indicated the vibration component passed by analyzer 3 is of a frequency equal to the difference between the corresponding oscillator frequency and the base frequency, 92,000 cycles per second, transmitted by the crystal filter. The frequency of this transmitted component is thus proportional to the capacity of the condenser 7. In the last section of analyzer 3 the transmitted current is rectified and supplied to pen control 8, which causes pen 9 to trace on recording chart 10 the amplitude of the transmitted vibration component.

Block 11 at lower left in the figure symbolically represents the engine which by its rotation produces the vibrations to be analyzed. Through flexible cable 12 engine 11 drives tachometer 13, preferably a Westinghouse A–80 tachometer, which develops an alternating voltage proportional in both frequency and amplitude to engine speed. At any given speed it is desired to select the vibration component of which the frequency is proportional to the engine's engine revolutions per second. This requires that variable condenser 7 assume a value likewise proportional to the instantaneous engine speed. To this end the voltage generated by tachometer 13 is amplified and rectified by a suitable apparatus indicated generally by numeral 14 and the rectified voltage so derived is applied to a pair of voltage-responsive devices 15 and 16. Device 15 is arranged as indicated by dashed line 17 to control the setting of condenser 7. Device 16 controls as indicated by dashed line 18 the position of chart 10. Accordingly, as the engine varies in speed the amplitude of the vibration component of frequency proportional by a chosen factor to the instantaneous engine speed is recorded on chart 10 on a vertical line of which the abscissa likewise corresponds to the engine speed.

Devices 15 and 16 are suitably "Brown Continuous Balance Systems" using self-balancing potentiometers as in the Brown potentiometer pyrometer manufactured by the Brown Instrument Company of Philadelphia, Pa. They received the rectified tachometer voltage over conductors 19 when switch S is closed upward. Conductors 19 divide into two parallel paths 20, 21, one path supplying directly device 16, the other supplying device 15 by way of potentiometer 22. The last-named element is used to select the factor of proportionality between engine revolutions per second and the frequency of oscillator 4. For a maximum engine speed of 3,000 revolutions per minute the output voltage from tachometer 13 is so amplified that after rectification it causes device 16 to place chart 10 in an extreme position from which it shifts proportionally to engine speed as the engine is slowed down. At the named engine speed the revolutions per second are 50 and potentiometer 22 may be so adjusted that it impresses on device 15, a voltage causing that device so to position the movable plate of condenser 7 that the oscillator frequency becomes 92,050 and the amplitude of the vibration component of frequency 50 cycles per second is recorded on chart 10. The frequency of the transmitted component thereafter decreases with engine speed, being always equal to the instantaneous engine revolutions per second. Other settings of potentiometer 22 correspond to the transmission of vibration components the frequencies of which are fractions or multiples of the engine revolutions per second. For example, at the extreme engine speed of 3,000 revolutions per minute, potentiometer 22 may be adjusted to tune oscillator 4 to 92,500, or to 92,020 cycles per second, corresponding to the transmission of vibration components of 500 cycles per second in the first case and 20 cycles per second in the second case.

In making an analysis with the described apparatus the pilot chooses a setting of potentiometer 22 and varies the engine speed over the range of interest. Then he resets potentiometer 22, again varies engine speed and so on, obtaining rapidly and automatically on chart 10 a series of records each of which exhibits as a function of engine speed the amplitude of the vibration components of which the frequency is related by a chosen factor to the instantaneous engine revolutions per second. From these records, as previously mentioned, there may be obtained by replotting an approximation of the conventional analysis in terms of vibration amplitudes at discrete frequencies for a given speed. However, with the apparatus thus far described it is not possible to obtain automatically and continuously the conventional record where the engine speed is constant, even if constant speed could be maintained for the desired time. The object of the present invention is to remove this limitation.

For this purpose there is provided the apparatus, shown in bold lines in the figure, which is brought into play when switch S is closed downward. On this closing of switch S one of conductors 19 remains connected to one each of conductors 20 and 21 and to ground. The other of conductors 20 is connected to wiper 27 of potentiometer 23 and the other of conductors 21 is connected to wiper 28 of potentiometer 24. Potentiometers 23 and 24 are supplied in parallel from battery 25, the voltage of which is chosen with regard to the sensitivity of devices 15 and 16 so that shaft 26 controlling simultaneously wipers 27 and 28 shall in an extreme position cause oscillator 4 and chart 10 to assume, respectively, the desired extreme tuning frequency and position. Wipers 27 and 28 are then in their extreme clockwise positions and as they turn counter-clockwise with shaft 26 the oscillator frequency decreases and the chart position correspondingly changes. The abscissas of the chart now represent frequencies, since chart position and oscillator tuning are simultaneously proportional to the same voltage and for each abscissa the recorded ordinate represents the amplitude of the vibration component of that frequency.

It will be noted that device 15 controlling oscillator frequency is supplied from linear potentiometer 24, while device 16 controlling chart position is supplied from logarithmic potentiometer 23. It is customary to record vibration amplitudes logarithmically, say in decibels, and to display the frequency scale also logarithmically. Analyzer 3 is constructed to record vibration amplitudes in decibels so that a linear potentiometer is appropriate to control device 15. Potentiometer 23 may also be linear, in which case the frequency scale of chart position is itself linear and this may for some purposes be desirable. However, it will usually be desired to have a logarithmic scale of abscissas, wherefore potentiometer 23 is preferably so made that the voltage selected by wiper 27 is in any position proportional to the logarithm of the distance of wiper 27 from an initial position, say that position in which it makes contact with the grounded negative terminal of battery 25. Such a potentiometer is simple to design. It is required only that the resistance of any turn of wire of the potentiometer winding shall be proportional to the reciprocal of the distance of that turn from the grounded end.

The angular position of shaft 26, which determines the frequency generated by oscillator 4 and the position of chart 10, is indicated on dial 29 graduated in frequency. Shaft 26 may be controlled by hand-operation of knob 30 or by remote control through any known mechanism generally designated by numeral 31.

In obtaining the conventional form of vibration analysis the operator sets the wiper on potentiometer 22 in some convenient position, throws switch S to close downward and operates shaft 26 to cover the desired frequency range. As the frequency of oscillator 4 varies over this range so does that of the vibration component isolated by analyzer 3. The magnitude of this component is recorded by pen 9 on chart 10 at an abscissa corresponding to the isolated frequency, either directly or logarithmically depending upon the linear or logarithmic shape of potentiometer 23. The conventional analysis is thus rapidly obtained as an alternative to the novel form of record described in the Brown application referred to.

What is claimed is:

1. A vibration analyzer for the analysis of mechanical vibrations comprising means for translating said vibrations into electrical waves, means for isolating and measuring the amplitudes of frequency components of said waves, means including a positionable chart for recording said amplitudes, a voltage responsive device controlling the frequency of the component isolated by said isolating and measuring means, a voltage responsive device controlling the position of said chart and means for recording the amplitudes of said components at positions on said chart correspondent to the frequencies of said components, said last named means including a source of constant voltage, means for applying simultaneously to said devices a variable fractional voltage from said source and means for varying said fractional voltage, whereby the frequency of the component isolated by said isolating and measuring means and the position of said chart are simultaneously varied in correspondence with the magnitude of said fractional voltage.

2. A vibration analyzer for the analysis of mechanical vibrations comprising means for translating said vibrations into electrical waves, means for isolating and measuring the amplitudes of frequency components of said waves, means including a positionable chart for recording said amplitudes, a first voltage responsive device controlling the frequency of the component isolated by said isolating and measuring means, a second voltage responsive device controlling the position of said chart and means for recording the amplitudes of said components at positions on said chart logarithmically correspondent to the frequencies of said components, said last named means including a source of constant voltage, means for applying from said source simultaneously to said first device a variable fractional voltage and to said second device a voltage logarithmically related to said fractional voltage and means for varying said fractional voltage, whereby the frequency of the component isolated by said isolating and measuring means and the position of said chart are simultaneously varied in linear and in logarithmic correspondence, respectively, with the magnitude of said fractional voltage.

3. A vibration analyzer for the analysis of mechanical vibrations comprising means for translating said vibrations into electrical waves, means for isolating and measuring the amplitudes of frequency components of said waves, means including a positionable chart for recording said amplitudes, a first voltage responsive device controlling the frequency of the component isolated by said isolating and measuring means, a second voltage responsive device controlling the position of said chart and means for recording the amplitudes of said components at positions on said chart logarithmically correspondent to the frequencies of said components, said last named means including a source of constant voltage, a linear and a logarithmic potentiometer connected in parallel across said source, means for deriving simultaneously from said linear and from said logarithmic potentiometer respectively a linear and a logarithmic fraction of the voltage of said source, means for applying simultaneously said linear fractional voltage to said first device and said logarithmic fractional voltage to said second device and means for simultaneously varying said fractional voltages, whereby the frequency of the component isolated by said isolating and measuring means and the position of said chart are simultaneously varied in linear and in logarithmic correspondence, respectively, with the magnitude of said linear fractional voltage.

DONALD MacKENZIE.